United States Patent [19]

Deininger et al.

[11] Patent Number: 4,928,027
[45] Date of Patent: May 22, 1990

[54] HIGH TEMPERATURE REFRACTORY MEMBER WITH RADIATION EMISSIVE OVERCOAT

[75] Inventors: William D. Deininger, Pasadena; David Q. King, Sunland, both of Calif.

[73] Assignee: The United States of America as represented by the administrator of the National Aeronautics and Space Administration, Washington, D.C.

[21] Appl. No.: 87,376

[22] Filed: Aug. 20, 1987

[51] Int. Cl.$^4$ ............................................. H02K 44/10
[52] U.S. Cl. ....................................................... 310/11
[58] Field of Search ........................................... 310/11

[56] References Cited

U.S. PATENT DOCUMENTS

| | | | |
|---|---|---|---|
| 3,430,082 | 2/1969 | Yerouchalmi | 310/11 |
| 4,093,879 | 6/1978 | Marchant et al. | 310/11 |
| 4,128,776 | 12/1978 | Boquist et al. | 310/11 |
| 4,173,187 | 11/1979 | Steverding | 252/478 |
| 4,180,484 | 12/1979 | Marchant | 310/11 |
| 4,218,629 | 8/1980 | Kayu Kawa et al. | 310/11 |
| 4,268,765 | 5/1981 | Hoover, Jr. | 310/11 |
| 4,447,748 | 5/1984 | Young et al. | 310/11 |

OTHER PUBLICATIONS

W. Deininger et al.; AIAA-86-1510; Development of an Arcjet Nuclear Electric Propulsion System for a 1993 Flight Demonstration (p. 5); Jun. 1986, AIAA-/ASME/SAE/ASEE 22nd Joint Propulsion Conference.

D. Q. King et al.; AIAA-87-1020; Design and Operation of a 100 KW Subscale MPD Engine (p. 2); May 1987; AIAA/DGLR/JSASS International Electric Propulsion Conference.

*Primary Examiner*—Patrick R. Salce
*Assistant Examiner*—Judson H. Jones
*Attorney, Agent, or Firm*—Thomas H. Jones; John R. Manning; Charles E. B. Glenn

[57] ABSTRACT

A radiation type heat dissipator for use in a plasma engine is formed of a refractory metal layer upon which there is deposited a radiation emissive coating made of a high emissivity material such as zirconium diboride. The radiation emissive coating has a surface emissivity coefficient substantially greater than the emissivility coefficient of the refractory metal and thereby enhances the optical radiating efficiency of the heat dissipator.

7 Claims, 2 Drawing Sheets 4,928,027

HIGH TEMPERATURE REFRACTORY MEMBER WITH RADIATION EMISSIVE OVERCOAT

BACKGROUND OF THE INVENTION

1. Origin of the Invention

The invention described herein was made in the performance of work under a NASA contract and is subject to the provisions of Public Law 96-517 (35 USC 202) in which the Contractor has elected not to retain title.

2. Field of the Invention

The present invention is directed to high temperature structural members such as used in arcjets and magnetoplasmadynamic (MPD) thrusters. More specifically, it is directed to a method for cooling such members.

3. Description of the Prior Art

High temperature plasmas such as produced in magnetohydrodynamic generators (MHD), magnetoplasmadynamic (MPD) thrusters and arcjets are highly corrosive to most materials. Consequently, refractory materials such as high temperature ceramics and high melting point metals, including for example tungsten and molybdenum, are used in structural elements that are exposed to the plasma environment.

FIG. 1 is a cross sectional view of a known arcjet 10. The arcjet 10 has an intake section 10a into which an ionizable plasma fluid 11 such as ammonia, argon, helium or hydrogen is injected at a first velocity. The arcjet 10 includes a plasma accelerator section 10b for accelerating the plasma fluid 11 to a substantially higher second velocity A tubular anode 14 made of a refractory metal such as thoriated tungsten is provided in the accelerator section 10b concentrically surrounding a refractory metal cathode 16 which is also composed of a refractory metal such as thoriated tungsten. An insulative propellant injector 15, made of a high temperature dielectric such as boron nitride, separates the cathode 16 from the anode 14. The anode 14 is fitted into a slightly tapered body 12 made of a refractory metal such as molybdenum. A high voltage +HV is applied across a space between the anode 14 and cathode 16 to generate an electric arc 17. The generated arc 17 interacts with the flowing plasma fluid 11 to heat the fluid to temperatures in excess of 1000° C. and to ionize the fluid.

The plasma fluid 11 is injected tangentially in a spiral-like fashion into a plenum chamber 18 of the device to create a vortex 11a about the cathode 16. The vortex 11a is directed into a narrow constriction area 19 of the accelerator section 10b wherein the plasma fluid is super-heated by the electric arc 17. The plasma fluid is then accelerated (primarily by thermal expansion) when it escapes through an expansion nozzle 20 of the device. Charged particles of the ionized plasma may be further accelerated by interaction with a magnetic field oriented orthogonally to the direction of their flow in the expansion nozzle 20. The magnetic field can be supplied from an external flux source outside of the device 10 or it can be generated entirely by the current of the electric arc 17. The combined effects of thermal expansion, generated magnetic fields and the high voltage electric fields between the cathode and anode create an acceleration force which propels the moving plasma 11 in an outflow direction A, as shown, out of the expansion nozzle 20 (defined by the anode 14) to a plasma discharge end 10c of the arcjet engine 10.

Electrons emitted from the cathode 16 are collected at a collecting area 14a on an inner surface of the anode 14 which defines part of the expansion nozzle 20. Because of the high temperatures involved (1000° C. and above), the electrodes 14 and 16 of the arcjet engine are susceptible to destruction from overheating. A variety of factors can lead to undesirable heat build up in localized portions of the engine. Such heat build up should preferably be dissipated as rapidly as possible to avoid the danger of any melting of the engine parts. The anode 14 in particular suffers from a phenomenon known as "anode spot formation" which is characterized by localized melting of various areas at the inner surface of the anode. Anode spot formation is often most pronounced at the collecting area 14a where the electric arc 17 meets with the expansion nozzle's inner wall. The localized melting causes pitting and ultimately leads to the complete destruction of the anode 14.

Active cooling of exterior surfaces of the anode 14 with dynamic cooling devices such as heat pipes and the like has been proposed as a solution for the overheating problem. Active cooling methods are disadvantageous because they require complicated pumping systems for moving a cooling fluid. When such pumping systems are incorporated into the design of an engine they add to the overall mass of the engine and increase the cost of the engine. The present invention provides another means for solving the overheating problem.

SUMMARY OF THE INVENTION

In accordance with the present invention, the optical radiating capabilities of high temperature members made of refractory metals such as tungsten, molybdenum and thoriated tungsten are enhanced by coating a surface of such members with a heat tolerant, high emissivity material such as zirconium diboride ($ZrB_2$).

An ideal black body radiator has a spectral emissivity coefficient of 1.00. Known refractory metals have spectral emissivity values of approximately 0.2–0.4. when subjected to temperatures in the range of 1200° C. to 2500° C. This limits their ability to function as radiative surfaces for expelling heat from high temperature portions of devices such as a plasma engine. It has been found that a layer of a heat tolerant, high emissivity material such as zirconium diboride can be deposited onto exterior surfaces of such refractory metals to increase the spectral emissivity coefficients of high temperature members made from these refractory metals to values on the order of 0.80 or higher. The improved emissivity makes possible a highly efficient heat radiator that can be used in numerous applications including the radiation cooling of plasma engines.

DETAILED DESCRIPTION

The above described anode overheating problem is overcome in accordance with the present invention by depositing a high emissivity, heat tolerant overcoat on the outer surface of a refractory metal. Preferably, the high emissivity overcoat is selected to have a coefficient of thermal expansion approximately equal to that of the refractory metal over a predetermined range of operating temperatures.

Figure 1:
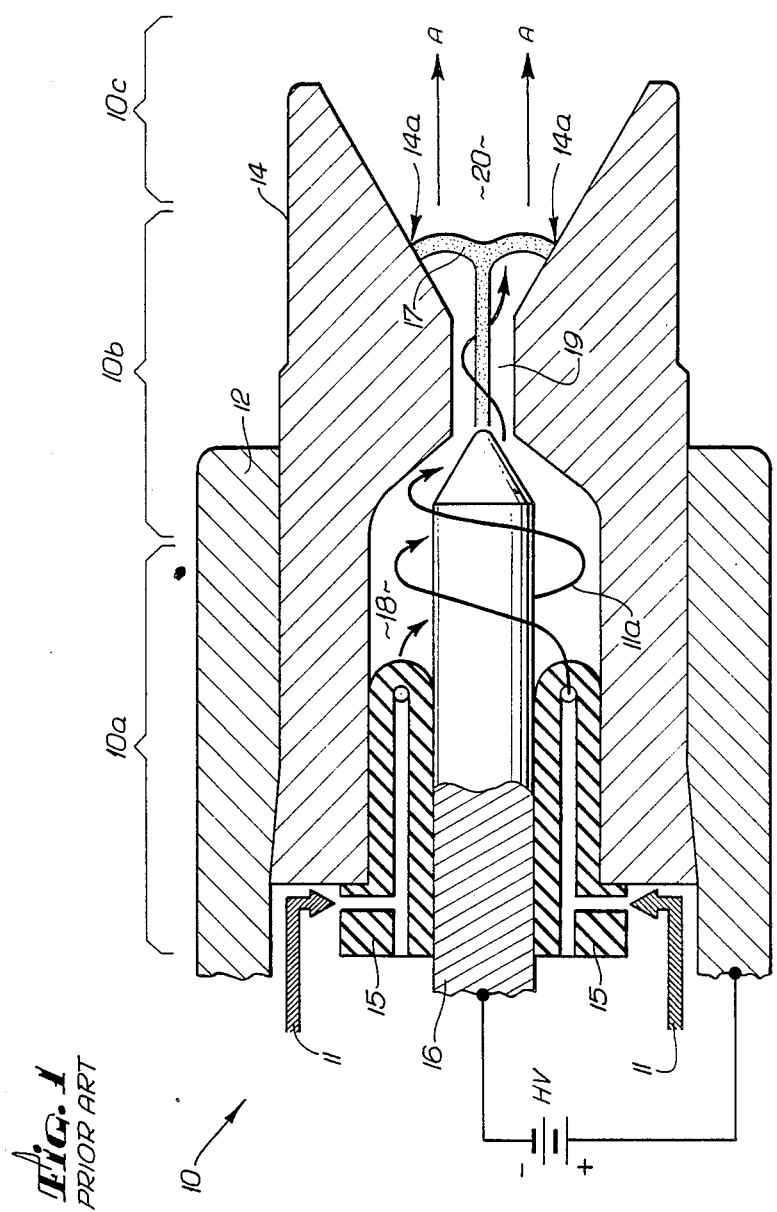
FIG. 1 is a cross sectional view of a previously known arcjet engine.

In high temperature environments such as that of the above described plasma (arcjet) engine, refractory metals including for example, tungsten, thoriated tungsten, and molybdenum, are used to form conductive electrodes. The electrodes interact electrically with a superheated plasma fluid of the engine to generate propulsive forces. The cathode 16 of FIG. 1 for example, is typically made of a thoriated tungsten (WTh) having approximately 80-98 wt % tungsten and 20-2 wt % thorium. Thorium is added to the tungsten in order to increase the electron emission capabilities of the cathode at high operating temperatures. The anode 14 is also typically made of thoriated tungsten while the body 12 is made of molybdenum. Titanium is another refractory metal often found in such structures. These materials have relatively low coefficients of spectral emissivity. The spectral emissivity coefficient of pure tungsten for example, varies between 0.15 and 0.45 depending on factors such as temperature, surface finish and the wavelength of the radiated energy. The high emissivity overcoat of the present invention improves the radiative properties of members having such low emissivity materials. For example, for an overcoat of zirconium diboride, the emissivity coefficient is greater than 0.8.

Figure 2:
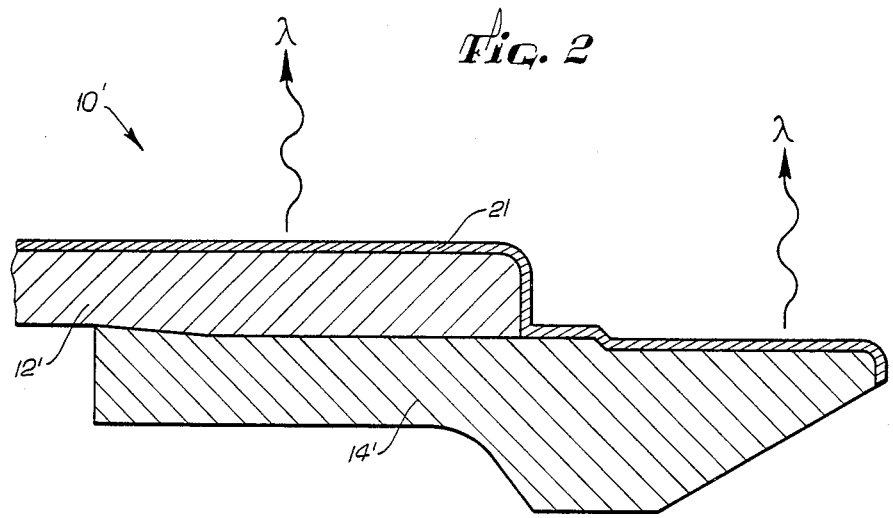
FIG. 2 is a cross sectional view of a coated portion of an arcjet engine in accordance with the present invention.
Figure 3:
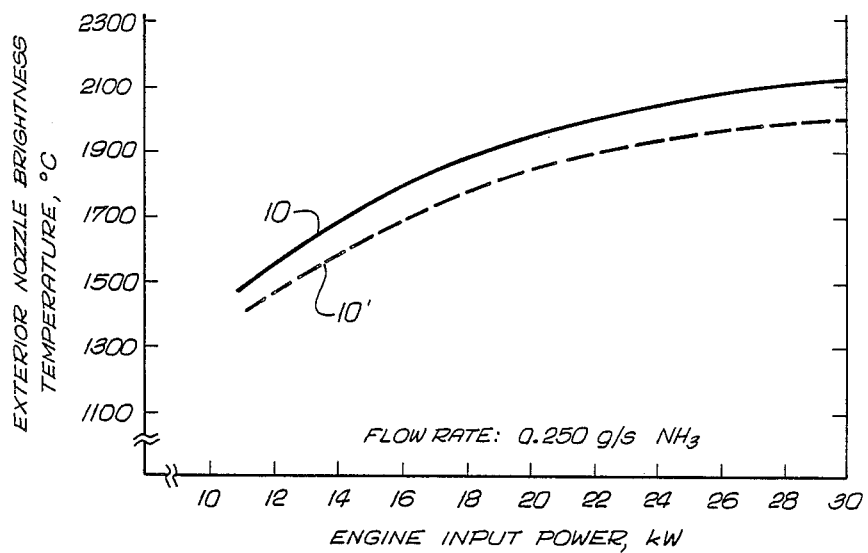
FIG. 3 is a comparative graph of exterior surface temperatures of both coated and uncoated engines under various operating conditions.

The results of comparative tests conducted with a baseline uncoated arcjet 10 and a coated arcjet 10' will be described by referring to FIGS. 2 and 3. FIG. 2 shows a coated portion of the arcjet 10' with parts similar to those of FIG. 1 denoted by primed reference numerals. A layer 21 of zirconium diboride ($ZrB_2$) having a thickness of approximately 0.005-0.010 inch was plasma sprayed onto the outer surfaces of the anode 14' (made of 2% thoriated tungsten) and the body 12' (made of molybdenum) of a test arcjet 10' such as shown in FIG. 2. Temperature measurements were taken of the outer surface during engine operation to determine the amount of radiated power λ emitted from the thusly sprayed surfaces with the plasma engine 10' operating at an input power of between 10-30 kilowatts. For reference, the spectral emissivity of a perfect black body radiator is assigned an effective emissivity coefficient of 1.00. An uncoated engine 10 whose outer surfaces were machined to a 16 microinch surface finish, was operated under identical input conditions to provide baseline temperature values.

Both the baseline engine 10 and the zirconium diboride coated engine 10' were operated with a propellant ($NH_3$) mass flow rate of 0.25 grams per second. The solid curve of FIG. 3 shows the surface temperature of the baseline engine 10 while the dashed curve indicates the results for the zirconium diboride sprayed engine 10'. An emissivity insensitive optical pyrometer was used to measure the exterior surface temperatures and to determine therefrom the amount of radiated power λ. The $ZrB_2$ coated engine 10' operated with an exterior temperature measuring approximately 120° C. cooler that of the uncoated baseline engine 10 over the test range. According to the Stefan-Boltzmann law (which basically states that radiated power is proportional to $T^4$) such a temperature difference can be attributed to a 30 percent increase in surface power emission at an operating temperature of 1800° C. Stated in other words, for the same amount of radiated power, the anode of the coated engine 10' operated on average approximately 120° C. cooler than the anode of the uncoated engine 10. The $ZrB_2$ coated engine 10' was operated to power levels as high as 37.0kW without indications of short term failure. The outer surface $ZrB_2$ coating of the test engine 10' initially had a matte gray appearance which took on a yellowish coloring after engine operation. The reason for this color transformation is not yet fully understood.

It will be appreciated that materials other than zirconium diboride can be deposited on the surface of a refractory member to improve the heat radiating capabilities of such a member. The high emissivity overcoat may be deposited on the outer surface of a refractory member by various known deposition methods including for example, sputtering, ion implantation, chemical conversion of the member's surface, thermal spraying, impact plating, chemical vapor deposition, electroplating, electroless plating and so forth. In some cases, an intermediate layer made of a suitable material for thermally coupling the high emissivity overcoat to the surface of the refractory member may be required to overcome incompatabilities in adhesion properties, differences of thermal expansion characteristics, to prevent undesirable chemical interactions, and so on. The following table lists her high emissivity materials that may be used as outer surface coatings in accordance with the invention. This list is, of course, not to be taken in a limiting sense. The range of emissivity coefficient observed for several materials are indicated in parenthesis.

| CARBIDES |
| --- |
| Tungsten Carbide |
| Titanium Carbide |
| Chromium Carbide |
| Hafnium Carbide |
| Zirconium Carbide |
| Silicon Carbide (0.6–0.9) |
| Molybdenum Carbide |
| Vanadium Carbide |
| Tantalum Carbide |
| Uranium Carbide |
| BORIDES |
| Vanadium Boride |
| Tantalum Boride |
| Molybdenum Boride |
| Niobium Boride |
| Tungsten Boride |
| Titanium Boride |
| Zirconium Boride (0.5–0.9) |
| NITRIDES |
| Titanium Nitride |
| Boron Nitride |
| Niobium Nitride |
| Silicon Nitride (0.5–0.7) |
| Tantalum Nitride |
| Uranium Nitride |
| Zirconium Nitride |
| OXIDES |
| Cerium Oxide (0.35–0.55) |
| Thorium Oxide (0.45–0.60) |
| Nickel Oxide |
| SILICIDES |
| Molybdenum Silicide |
| Tantalum Silicide |
| Vanadium Silicide |
| Niobium Silicide |

While the above described $ZrB_2$ high emissivity coating is described as being applied to the outer surface of a plasma accelerator, it will be apparent that high emissivity overcoats can also be used to create heat radiators in plasma decelerators such as found in MHD generators wherein a high velocity plasma flow is decelerated to produce electromagnetic power. High emissivity coatings may further be used for other high temperature applications that utilize low emissivity refractory materials such as tungsten and molybdenum. The selection of a particular high emissivity material that is to be coupled to a low emissivity base member is of course predicated upon considerations such as cost, desired temperature range, the matching of thermal expansion coefficients for the coating and the refractory substrate, and the ease with which a particular coating material can be deposited on the refractory substrate. As such, the scope of the invention should not be limited to the particular embodiment described above but should rather be defined by the appended claims and equivalents thereof.

We claim:

1. A heat radiator for radiating heat generated by high temperature plasma in a plasma accelerator/decelerator having an interior portion in contact with the plasma and an exterior portion not in contact with the plasma comprising:

a first layer made of a refractory material having a first spectral emissivity coefficient, the refractory material being disposed in the interior of the plasma accelerator/decelerator so as to contact the plasma and be heated by the plasma and wherein said refractory material is capable of withstanding temperatures of 1000° C. or higher without melting; and a second radiative layer forming a portion of the exterior of the plasma accelerator/decelerator and mechanically and thermally coupled to the first layer to radiate heat from the first layer away from the interior of the plasma accelerator/decelerator, the second layer being made of a radiation emissive material including zirconium diboride and having a second spectral emissivity coefficient that is substantially greater than the first spectral emissivity coefficient for radiatively cooling the first layer and a coefficient of thermal expansion substantially equal to that of said refractory material.

2. A heat radiator according to claim 1 wherein the refractory material includes a refractory metal.

3. A heat radiator according to claim 2 wherein the refractory metal includes a metal selected from the group consisting of tungsten, molybdenum, titanium, and thoriated tungsten.

4. A heat radiator according to claim 3 wherein the refractory material includes the refractory metal of thoriated tungsten.

5. A heat radiator according to claim 4 wherein the second layer has a thickness in the range 0.005-0.010 inch.

6. A radiation cooled plasma accelerator/decelerator comprising:

plasma fluid inlet means for receiving a plasma fluid moving at a first velocity;

plasma fluid output means for discharging the plasma fluid at a second velocity; and electrode means for interacting electrically with the plasma fluid to change the velocity of the plasma fluid from the first velocity to the second velocity, the electrode means including means for radiatively cooling said electrode means comprising a refractory metal layer having a first surface disposed in facing relation to the moving plasma fluid and a second surface disposed to face away from the plasma fluid, and a high emissivity layer, made of zirconium diboride, and wherein the high emissivity layer has a thickness less than about 0.010 inches and is thermally coupled to the second surface of the refractory metal layer for radiatively cooling the electrode at the second surface without the use of active cooling means.

7. The plasma accelerator/decelerator of claim 6 wherein the metal of the refractory layer is selected from the group consisting of tungsten, molybdenum, titanium, and thoriated tungsten.

* * * * *